US009067361B2

(12) United States Patent
El-Siblani

(10) Patent No.: US 9,067,361 B2
(45) Date of Patent: *Jun. 30, 2015

(54) PROCESS AND DEVICE FOR PRODUCING A THREE-DIMENSIONAL OBJECT

(71) Applicant: Envisiontec GmbH, Gladbeck (DE)

(72) Inventor: Ali El-Siblani, Dearborn Heights, MI (US)

(73) Assignee: Envisiontec GmbH, Gladbeck (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,826

(22) Filed: May 8, 2014

(65) Prior Publication Data
US 2014/0239554 A1    Aug. 28, 2014

Related U.S. Application Data

(63) Continuation of application No. 12/217,287, filed on Jul. 2, 2008, now Pat. No. 8,845,316.

(60) Provisional application No. 60/958,387, filed on Jul. 5, 2007.

(30) Foreign Application Priority Data

Jul. 4, 2007   (EP) ..................................... 07013097

(51) Int. Cl.
*B29C 67/00*     (2006.01)
*B29C 70/88*     (2006.01)

(52) U.S. Cl.
CPC ......... *B29C 67/0088* (2013.01); *B29C 67/0051* (2013.01); *B29C 70/88* (2013.01); *B29C 67/0066* (2013.01); *B29C 67/0077* (2013.01)

(58) Field of Classification Search
CPC   B29C 67/0051; B29C 70/88; B29C 67/0088; B29C 67/0077; B29C 67/0066

USPC ......... 425/149, 174.4, 135, 150; 264/34, 401, 264/497

See application file for complete search history.

(56) References Cited

U.S. PATENT DOCUMENTS 4,752,498 A   6/1988   Fudim
4,837,379 A   6/1989   Weinberg et al.
(Continued)

FOREIGN PATENT DOCUMENTS

DE          4105314 A1      8/1991
DE          4102257 A1      7/1992
(Continued)

OTHER PUBLICATIONS

C. Sun, et al., "Projection Micro-Stereolithography Using Digital Micro-Mirror Dynamic mask," Sensors and Actuators A 121 (2005) 113-120.
(Continued)

*Primary Examiner* — Jeremiah Smith
(74) *Attorney, Agent, or Firm* — Hansen IP Law PLLC

(57) ABSTRACT

A process for producing at least one three-dimensional object by solidifying a solidifyable material, comprising the steps of:
providing an object carrier capable of carrying the object to be produced;
providing a material capable of solidifying when subjected to energy supply;
bringing a solidifyable material carrier/provider in a position to carry/provide solidifyable material at least in a building region where solidifyable material is to be solidified;
supplying, to the building region, energy capable of solidifying the solidifyable material; and
sensing, measuring and/or controlling a condition selected from the group consisting of pressure and/or strain. Alternatively or in combination, contact pressure, fluid pressure and/or material flowability can be sensed and/or adjusted.

18 Claims, 14 Drawing Sheets

(56) References Cited

U.S. PATENT DOCUMENTS

| | | | |
|---|---|---|---|
| 4,929,402 A | 5/1990 | Hull | |
| 4,999,143 A | 3/1991 | Hull et al. | |
| 5,093,130 A | 3/1992 | Fujii et al. | |
| 5,137,662 A | 8/1992 | Hull et al. | |
| 5,139,338 A | 8/1992 | Pomerantz et al. | |
| 5,143,663 A | 9/1992 | Leyden et al. | |
| 5,157,423 A | 10/1992 | Zur | |
| 5,171,490 A | 12/1992 | Fudim | |
| 5,173,266 A | 12/1992 | Kenney | |
| 5,174,931 A | 12/1992 | Almquist et al. | |
| 5,236,637 A | 8/1993 | Hull | |
| 5,247,180 A | 9/1993 | Mitcham et al. | |
| 5,248,456 A | 9/1993 | Evans, Jr. et al. | |
| 5,263,130 A | 11/1993 | Pomerantz et al. | |
| 5,268,994 A | 12/1993 | Keskes | |
| 5,289,214 A | 2/1994 | Zur | |
| 5,298,208 A | 3/1994 | Sibley et al. | |
| 5,306,446 A | 4/1994 | Howe | |
| 5,345,391 A | 9/1994 | Hull et al. | |
| 5,360,981 A | 11/1994 | Owen et al. | |
| 5,391,072 A | 2/1995 | Lawton et al. | |
| 5,447,822 A | 9/1995 | Hull et al. | |
| 5,510,077 A | 4/1996 | Dinh et al. | |
| 5,529,473 A | 6/1996 | Lawton et al. | |
| 5,545,367 A | 8/1996 | Bae et al. | |
| 5,569,431 A | 10/1996 | Hull | |
| 5,571,471 A | 11/1996 | Hull | |
| 5,573,721 A | 11/1996 | Gillette | |
| 5,630,891 A | 5/1997 | Peterson et al. | |
| 5,651,934 A | 7/1997 | Almquist et al. | |
| 5,653,925 A | 8/1997 | Batchelder | |
| 5,762,856 A * | 6/1998 | Hull | 264/401 |
| 5,823,778 A | 10/1998 | Schmitt et al. | |
| 5,858,746 A | 1/1999 | Hubbell et al. | |
| 5,876,550 A | 3/1999 | Feygin et al. | |
| 5,891,382 A | 4/1999 | Almquist et al. | |
| 5,894,036 A | 4/1999 | Tylko | |
| 5,902,537 A | 5/1999 | Almquist et al. | |
| 5,945,058 A | 8/1999 | Manners et al. | |
| 5,980,813 A | 11/1999 | Narang et al. | |
| 6,013,099 A | 1/2000 | Dinh et al. | |
| 6,027,324 A | 2/2000 | Hull | |
| 6,048,487 A | 4/2000 | Almquist et al. | |
| 6,051,179 A | 4/2000 | Hagenau | |
| 6,153,034 A | 11/2000 | Lipsker | |
| 6,158,946 A | 12/2000 | Miyashita | |
| 6,171,610 B1 | 1/2001 | Vacanti et al. | |
| 6,280,727 B1 | 8/2001 | Prior et al. | |
| 6,281,903 B1 | 8/2001 | Martin et al. | |
| 6,334,865 B1 | 1/2002 | Redmond et al. | |
| 6,352,710 B2 | 3/2002 | Sawhney et al. | |
| 6,391,245 B1 | 5/2002 | Smith | |
| 6,500,378 B1 | 12/2002 | Smith | |
| 6,547,552 B1 | 4/2003 | Fudim et al. | |
| 6,630,009 B2 | 10/2003 | Moussa et al. | |
| 6,733,267 B2 | 5/2004 | Chapman et al. | |
| 6,764,636 B1 | 7/2004 | Allanic et al. | |
| 6,833,231 B2 | 12/2004 | Moussa et al. | |
| 6,833,234 B1 | 12/2004 | Bloomstein et al. | |
| 6,942,830 B2 | 9/2005 | Mulhaupt et al. | |
| 6,974,656 B2 | 12/2005 | Hinczewski | |
| 6,989,225 B2 | 1/2006 | Steinmann | |
| 7,052,263 B2 | 5/2006 | John | |
| 7,073,883 B2 | 7/2006 | Billow | |
| 7,133,041 B2 | 11/2006 | Kaufman et al. | |
| 7,195,472 B2 | 3/2007 | John | |
| 7,215,430 B2 | 5/2007 | Kacyra et al. | |
| 7,261,542 B2 | 8/2007 | Hickerson et al. | |
| 7,467,939 B2 | 12/2008 | Sperry et al. | |
| 8,845,316 B2 * | 9/2014 | Schillen et al. | 425/149 |
| 2001/0028495 A1 | 10/2001 | Quate et al. | |
| 2001/0048183 A1 | 12/2001 | Fujita | |
| 2002/0028854 A1 | 3/2002 | Allanic et al. | |
| 2002/0153640 A1 | 10/2002 | John | |
| 2002/0155189 A1 | 10/2002 | John | |
| 2003/0067539 A1 | 4/2003 | Doerfel et al. | |
| 2003/0074096 A1 | 4/2003 | Das et al. | |
| 2003/0205849 A1 | 11/2003 | Farnworth | |
| 2004/0008309 A1 | 1/2004 | Yamahara et al. | |
| 2004/0118309 A1 | 6/2004 | Fedor et al. | |
| 2005/0023710 A1 | 2/2005 | Brodkin et al. | |
| 2005/0208168 A1 | 9/2005 | Hickerson et al. | |
| 2005/0248061 A1 | 11/2005 | Shkolnik et al. | |
| 2005/0248062 A1 | 11/2005 | Shkolnik et al. | |
| 2005/0288813 A1 | 12/2005 | Yang et al. | |
| 2006/0078638 A1 | 4/2006 | Holmboe et al. | |
| 2006/0192312 A1 | 8/2006 | Wahlstrom et al. | |
| 2006/0239588 A1 | 10/2006 | Hull et al. | |
| 2006/0249884 A1 | 11/2006 | Partanen et al. | |
| 2007/0074659 A1 | 4/2007 | Wahlstrom | |
| 2007/0075458 A1 | 4/2007 | Wahlstrom et al. | |
| 2007/0075459 A1 | 4/2007 | Reynolds et al. | |
| 2007/0075460 A1 | 4/2007 | Wahlstrom et al. | |
| 2007/0075461 A1 | 4/2007 | Hunter et al. | |
| 2007/0077323 A1 | 4/2007 | Stonesmith et al. | |
| 2007/0120842 A1 | 5/2007 | Hess | |
| 2007/0257055 A1 | 11/2007 | Scott et al. | |
| 2007/0259066 A1 | 11/2007 | Sperry et al. | |
| 2008/0038396 A1 | 2/2008 | John et al. | |
| 2008/0054531 A1 | 3/2008 | Kerekes et al. | |
| 2008/0169586 A1 | 7/2008 | Hull et al. | |
| 2008/0169589 A1 | 7/2008 | Sperry et al. | |
| 2008/0170112 A1 | 7/2008 | Hull et al. | |
| 2008/0179786 A1 | 7/2008 | Sperry et al. | |
| 2008/0179787 A1 | 7/2008 | Sperry et al. | |
| 2008/0181977 A1 | 7/2008 | Sperry et al. | |
| 2008/0206383 A1 | 8/2008 | Hull et al. | |
| 2008/0217818 A1 | 9/2008 | Holmboe et al. | |
| 2008/0226346 A1 | 9/2008 | Hull et al. | |
| 2008/0231731 A1 | 9/2008 | Hull | |
| 2008/0309665 A1 | 12/2008 | Gregory, II et al. | |

FOREIGN PATENT DOCUMENTS

| | | |
|---|---|---|
| DE | 4125534 A1 | 2/1993 |
| DE | 9319405.6 U1 | 5/1994 |
| DE | 19727554 A1 | 1/1999 |
| DE | 29911122 U1 | 11/1999 |
| DE | 19838797 A1 | 3/2000 |
| DE | 19929199 A1 | 1/2001 |
| DE | 10003374 C1 | 8/2001 |
| DE | 10018987 A1 | 10/2001 |
| DE | 4340108 C3 | 8/2003 |
| DE | 69909136 T2 | 5/2004 |
| DE | 10256672 A1 | 6/2004 |
| EP | 0250121 A2 | 12/1987 |
| EP | 0426363 A2 | 5/1991 |
| EP | 0435564 A2 | 7/1991 |
| EP | 0466422 A1 | 1/1992 |
| EP | 0484086 A1 | 5/1992 |
| EP | 1250995 A1 | 10/2002 |
| EP | 1250997 A1 | 10/2002 |
| EP | 1192041 B1 | 3/2003 |
| EP | 1156922 B1 | 6/2003 |
| EP | 1338846 A2 | 8/2003 |
| EP | 1674243 A2 | 6/2006 |
| EP | 1876012 A1 | 1/2008 |
| EP | 1894704 A1 | 3/2008 |
| EP | 1950032 A2 | 7/2008 |
| EP | 2011631 B1 | 4/2012 |
| FR | 2254194 A5 | 7/1975 |
| FR | 2583334 A1 | 12/1986 |
| FR | 2634686 A1 | 2/1992 |
| FR | 2692053 A1 | 12/1993 |
| JP | 04371829 A | 12/1992 |
| JP | 08150662 | 6/1996 |
| JP | 08192469 A | 7/1996 |
| JP | 09076353 A | 3/1997 |
| JP | 2000336403 A | 12/2000 |
| JP | 2007529349 T | 10/2007 |
| WO | 9511007 A1 | 4/1995 |
| WO | 9600422 A1 | 1/1996 |

(56) References Cited

FOREIGN PATENT DOCUMENTS

| | | | |
|---|---|---|---|
| WO | 0172501 | A1 | 10/2001 |
| WO | 2005089463 | A2 | 9/2005 |
| WO | 2005110722 | A1 | 11/2005 |

OTHER PUBLICATIONS

Opposition to EP 1,849,587, dated Apr. 8, 2010.
S. Ventura, et al., "Freeform Fabrication of Functional Silicon Nitride Components by Direct Photoshaping," Mat. Res. Sol. Symp. Proc., vol. 625 (2000).
K. Takahashii, "A New Application of DMD to Photolithography and Rapid Prototyping System," Institute of Electronics, Information, and Communication Engineers.
Opposition to EP 2 011 631, dated Jan. 14, 2013.
European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Huang,, et al., "On-line force monitoring of platform ascending rapid prototyping system" Journal of Materials Processing Technology 159 (2005) 257-264.
Wohlers Report 2000. "Rapid Prototyping & Tooling State of the Industry Annual Worldwide Progress Report", T. Wohlers, Wohlers Association, Inc., Fort Collins, Colorado (2000).
Stark, G.B., et al., "Biological Matrices and Tissue Reconstruction," Springer Publications, Berlin (1998).
Sachs, E., et al., "Three Dimensional Printing: Rapid Tooling and Prototypes Directly from CAD Model," Journal of Engineering for Industry, 114:481-488 (1992).
Kuhtreiber, W., Ph.D., et al., "Cell Encapsulation Technology and Therapeutics," Birkhauser, Boston (1998).
Landers, R., and Mulhaupt, R., "Desktop Manufacturing of Complex Objects, Prototypes and Biomedical Scaffolds by means of Computer-Assisted Design Combined with Computer-Guided 3D Plotting of Polymers and Reactive Oligomers," Macromolecular Materials and Engineering, 282:17-22 (2000).
Okada, T., and Ikada, Y., "Tissue Reactions to Subcutaneously Implanted, Surface-Modified Silicones," Journal of Biomedical Materials Research, 27:1509-1518 (1993).
Relou, I.A., et al., "Effect of Culture Conditions on Endothelial Cell Growth and Responsiveness," Tissue & Cell, 30 (5):525-538 (1998).
Nikolaychik, V.V., et al., A New, Cryoprecipitate Based Coating for Improved Endothelial Cell Attachment and Growth on Medical Grade Artificial Surfaces:, ASAIO Journal, 40:M846-M852 (1994).
Burns, "Automated Fabrication Improving Productivity in Manufacturing," 1993 (ISBN 0-13-119462-3).
English translation of Patent Abstracts of Japan, JP 08150662 from: http://www19.ipdl.inpit.go.jp/PA1/result/main/woYeaMaDA408150662P1.htm Jul. 15, 2011.
English translation of DE19929199 from Lexis Nexis Total Patent.
English translation of DE19727554A1 from Lexis Nexis Total Patent.
English translation of DE 10256672 from Lexis Nexis Total Patent.
English translation of JP09076353, from Lexis Nexis,Total Patent.
English translation of JP2007529349, from Lexis Nexis,Total Patent.
English translation of JP2000336403, from Lexis Nexis,Total Patent.
English translation of DE4102257, from Lexis Nexis Total Patent.
English translation of DE4105314, from Lexis Nexis Total Patent.
English translation of DE4125534, from Lexis Nexis Total Patent.
English translation of DE4340108, from Lexis Nexis Total Patent.
English translation of DE9319405, from Lexis Nexis Total Patent.
English translation of DE10003374, from Lexis Nexis Total Patent.
English Abstract of JP04371829, from Lexis Nexis,Total Patent.
English translation of WO0172501, from Lexis Nexis Total Patent.
English translation of FR2692053, from Lexis Nexis Total Patent.
English translation of WO2005110722, from Lexis Nexis Total Patent.
English translation of EP1250997, from Lexis Nexis Total Patent.
English translation of DE69909136, from Lexis Nexis Total Patent.
English translation of DE29911122, from Lexis Nexis Total Patent.
English translation of JP08192469, from Lexis Nexis Total Patent.
English translation of FR2634686, from Lexis Nexis Total Patent.
English translation of FR2583334, from Lexis Nexis Total Patent.
English translation of FR2254194, from Lexis Nexis Total Patent.
English translation of EP426363, from Lexis Nexis Total Patent.
English translation of DE19838797, from Lexis Nexis Total Patent.
English translation of DE10018987, from Lexis Nexis Total Patent.

* cited by examiner

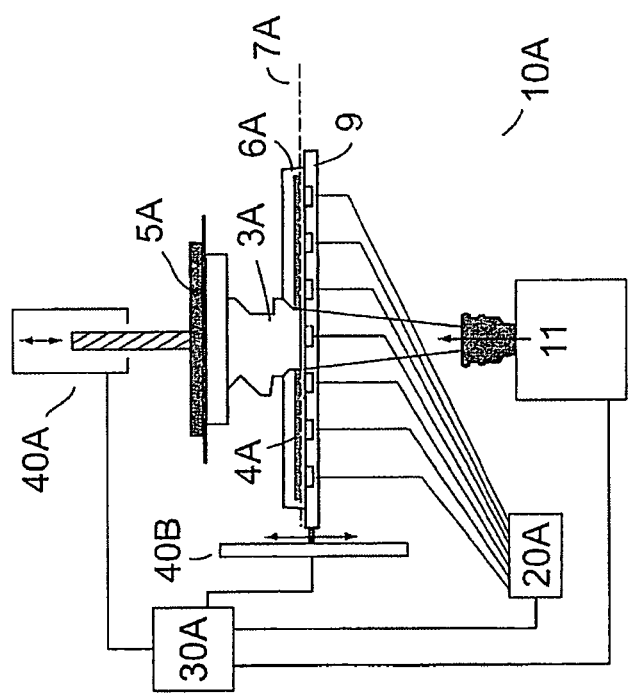

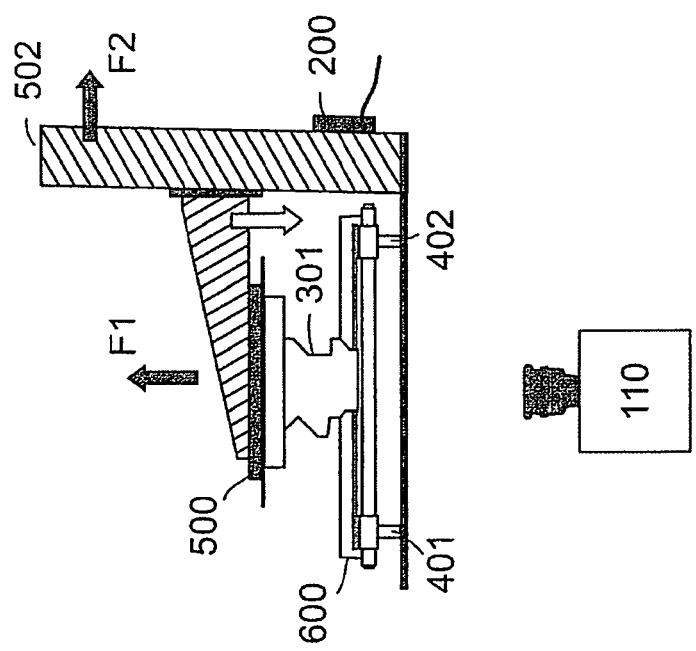

PROCESS AND DEVICE FOR PRODUCING A THREE-DIMENSIONAL OBJECT

CROSS-REFERENCE TO RELATED APPLICATIONS

This application is a continuation of U.S. patent application Ser. No. 12/217,287, filed on Jul. 2, 2008, which claims the benefit of U.S. Provisional Patent Application No. 60/958,387, filed on Jul. 5, 2007. The entire contents of each of the foregoing applications are hereby incorporated by reference.

FIELD OF THE INVENTION

The present invention relates to a process and a device for producing at least one three-dimensional object by solidifying a solidifyable material.

BACKGROUND

Known processes and devices for producing at least one three-dimensional object by solidifying a solidifyable material are sometimes referred to as solid freeform fabrication, rapid prototyping and manufacturing techniques, and sometimes they are more specifically referred to as stereolithography, laser sintering, fused deposition modelling, selective light modulation and the like.

It is sometimes difficult to apply such processes and techniques to produce three-dimensional objects in a reliable manner, especially when the objects have quite different structural portions, such as mass portions and delicate or fine portions, or when the formation of auxiliary support structures are involved. Further, it is often difficult to adopt the aforementioned techniques to the use of different types or compositions of solidifying materials, partly depending on the technique used and partly depending on the desired type of three-dimensional object to be produced.

Therefore, an object of the present invention was to provide a process and a device for producing at least one three-dimensional object by solidifying a solidifyable material, which process or device is improved in terms of reliability.

SUMMARY

In accordance with an embodiment the present invention provides a process for producing at least one three-dimensional object by solidifying a solidifyable material, comprising the steps of:
providing an object carrier capable of carrying the object to be produced;
providing a material capable of solidifying when subjected to energy supply;
bringing a solidifyable material carrier/provider in a position to carry or provide solidifyable material at least in a building region where solidifyable material is to be solidified;
supplying, to the building region, energy capable of solidifying the solidifyable material; and sensing, measuring and/or adjusting a condition selected from pressure and/or strain in a status of said building region going to be formed or being located between
said object carrier or previously solidified material carried thereon, and
said solidifyable material carrier/provider.
The pressure and/or strain can thus be effectively sensed or measured at a location indicative for the pressure and/or strain at the building region.

Preferably, the pressure and/or strain is sensed or measured at least at a region selected from: in or at the building region, in or at the object carrier, in or at the solidifyable material carrier/provider, in or at the frame carrying the solidifyable material carrier/provider, and particularly in or at the frame carrying the object.

Alternatively or in combination with sensing/measuring pressure and/or strain, a contact pressure, fluid pressure and/or a material flowability can advantageously be sensed or controlled/adjusted at a location effective for any one of these conditions in or at the building region.

Sensing, measuring or adjusting the conditions mentioned above, alone or in combination, can thus effectively be preformed to cope with peculiar problems in a status where the building region is going to be formed during supply of the solidifyable material, and/or where separation of the solidifyable material carrier/provider from just solidified material is performed after the solidification has taken place by energy supply.

The present invention further provides a device for producing at least one three-dimensional object by solidifying a solidifyable material, comprising:
a device for supply of energy to a building region, the energy supply device being capable of solidifying the solidifyable material;
an object carrier capable of carrying the object to be produced;
a solidifyable material carrier/provider being arranged to carry or provide solidifyable material at least in a building region;
and
a sensor arranged to sense or measure, and/or a controller arranged to control at least one condition of (i) pressure, (ii) strain, (iii) contact pressure, (iv) fluid pressure and (v) material flowability;
wherein the sensor, the sensor group or the sensor array is provided at a location indicative for the respective condition, alone or in combination, in or at the building region.

The sensor may be a single sensor, a group of sensors or an array of sensors.

When conditions (i) and/or (ii) are sensed or measured, the corresponding sensor, sensor group or sensor array is preferably arranged at least at a region selected from: in or at the building region, in or at the object carrier, in or at the solidifyable material carrier/provider, in or at the frame carrying the solidifyable material carrier/provider, and particularly in or at the frame carrying the object carrier.

When any one of conditions (iii) to (v) are sensed or measured, the corresponding sensor, sensor group or sensor array is preferably arranged at least in or at the building region. When any one of conditions (iii) to (v) are controlled/adjusted, a suitable agitator or means is provided which is effective to control such condition at least in or at the building region.

The term "building region" used herein means the region where yet un-solidified material is provided for solidification, or is actually subjected to solidification, and it typically corresponds likewise to a "separation region" where separation of the solidifyable material carrier/provider from just solidified material is performed after the solidification.

In the above mentioned embodiments, after supply of energy to the building region for solidification of the solidifyable material, normally a subsequent step is processed for providing fresh solidifyable material again to the building region where solidifyable material is to be solidified next. For this subsequent step, normally the object carrier carrying the previously solidified material makes a vertical, a transversal and/or a tilt movement from, in or at the building region.

As used herein, the terms "sensing", "sensed" and "measuring" and "measured" means activity or activities involving use of a sensor or a measurement device or unit. As further used herein, the terms "control", "adjust" and "adjustment" means activity or activities involving an influencing measure, means or force, as opposed to a mere uncontrolled, passive and inherent property of its own. Preferably, said activity or activities is(are) performed, when solidifyable material is provided to the building region with the solidifyable material carrier/provider; at a time in advance or during supply of energy; and/or when solidified material is separated from the building region or from the solidifyable material carrier/provider. In particular, said activity or activities is(are) performed, when the object carrier (or a previously solidified layer formed thereon) is going to contact fresh solidifyable material (or the solidifyable material carrier/provider carrying the fresh solidifyable material) for forming the building region, and/or when the solidified material is separated at the building region or from the solidifyable material carrier/provider. Thus, if desired the concept of the invention may be omitted in cases where mere printing is carried out with the use of a printing head or a development drum, optionally omitting cases where there is no pressure contact for bringing solidifyable material at least to the building region, and/or where no separation forces may occur for separating solidifyable material carrier/provider from just solidified material after the solidification has taken place by energy supply.

In the meaning of the present invention, sensing or measuring the specified condition "in or at" the regions specified above includes not only directly "in" or "at", but includes sensing or measuring such that the sensed or measured value is indicative of the corresponding characteristic in or at or near the corresponding region, e.g. the building region, the object carrier and/or the solidifyable material carrier/provider. The building region may be formed, for example, by a building plane or a solidification area with desired dimensions in X, Y and Z directions (including, for example, XY plane and areas, XZ plane and areas, and YZ plane and areas). A building area may be flat, but is not necessarily flat. Further, building regions may be formed as layers, as cross-sections, as a matrix such as voxel matrix, or in any other forms. Generally, the region for sensing or measuring the specified condition further includes, for example, regions or positions on or at the three-dimensional object being solidified, on or at elements connected to the building region or to the object carrier or to the solidifyable material carrier/provider, and further includes contact-free sensing or measuring methods such as via wireless transfer. As the object carrier may be an object carrying platform, sensing or measuring may be preferably carried out in or at the surface such as a main plane of a platform, or between multiple platforms. Further, there can be used a combination of sensing or measuring both "in or at" the building region, "in or at" the object carrier, and "in or at" the solidifyable material carrier/provider.

According to yet another embodiment, the present invention provides a preparation process for preparing a production process of at least one three-dimensional object by solidifying a solidifyable material, said prepared production process being of a type comprising:
providing an object carrier capable of carrying the object to be produced;
bringing a solidifyable material carrier/provider in a position to carry or provide solidifyable material at least in a building region where solidifyable material is to be solidified; and supplying, to the building region, energy capable of solidifying the solidifyable material;
wherein said preparation process includes the steps of:
providing build data which i.e. as examples but not limited to them can be bitmap data of cross sections and/or layers to be build or sliced data which, when executed, allow to produce the at least one three-dimentional object; and
nominally setting process parameters on the basis of said build data of said solidifyable layer and/or cross sections or adjacent cross sections and/or uniform or non uniform plane, wherein said process parameters are nominally set, depending on at least one of a structure of said at least one three-dimensional object to be produced, a presence or absence or a structure of an auxiliary support, type of solidifyable material and composition of solidifyable material, to control at least one of the following parameters:

(a) moving distance between the object carrier and the building region, or between the object carrier and a surface (such as, e.g. a main plane) of said solidifyable material carrier/provider, before providing energy for solidification;
(b) pressure force of either the object carrier or the solidifyable material carrier/provider, respectively, towards the building region;
(c) degree of insertion of object carrier, optionally having previously solidified material thereon, into solidifyable material carried or provided;
(d) separation force of either the object carrier or the solidifyable material carrier/provider, respectively, from the building region;
(e) fluid pressure in or at the building region;
(f) moving speed of said object carrier or said solidifyable material carrier/provider, respectively, in a direction towards or in a direction away from the building region;
(g) tensile load of said solidifyable material carrier/provider;
(h) coplanarity or tilt angle between a surface of the object carrier and a surface (such as, e.g. a main plane) of said solidifyable material carrier/provider; and
(i) rolling away or gliding away of the solidifyable material carrier/provider from a building region.

Further preferred embodiments are set forth in further subclaims of the independent claims. In the various embodiments of parameters (a) to (i) defined above, the object carrier may be suitably designed as an object carrier platform.

By the process and the device according to the present invention, it is possible to provide a real-time observation of critical factors depending on the actual situation of the building process, as a response to sensed or measured value(s) of at least one of the aforementioned critical conditions occurring in or at (including close to) the building region or the object carrier or the solidifyable material carrier. For example, corresponding to a type or a composition of a solidifyable material used in a certain process type of producing three-dimensional objects, and/or corresponding to a certain built structure or auxiliary support structure produced at a certain time, the three-dimensional object can be produced in a reliable manner. For example, the actual pressure or stress which is going to built up or existing in or at the building region, and/or in or at the object carrier or its support structure, and/or in, at or near the solidifyable material carrier/provider or its support structure may significantly differ depending on whether the solidifyable material is in a liquid or in a particulate form, whether the solidifyable material is solid, thixotrophic, has a relatively high or medium or a relatively low viscosity, whether the solidifyable material is liquid or fluid but contains dispersed particles, or whether a large or small built area, a large or small voxel matrix, or a large or small cross-section and/or a large or small layer of the 3D object at a time it is solidified. Similar observations apply to the conditions of strain, contact pressure, fluid pressure and/or material flowability in or at the building region. In particular, a condition selected from pressure, strain, contact pressure, fluid pressure and material flowability becomes relevant according to the concept of the present invention in or at a building region located between the object carrier (or the previously solidified material carried thereon) and the solidifyable material carrier/provider. That is, a movement of the object carrier and/or the solidifyable material carrier/provider, either in a mutually vertical and/or horizontal manner, for providing solidifyable material at least in a building region will have a relevant influence on at least one of the afore mentioned conditions of pressure, strain, contact pressure, fluid pressure and material flowability in, at or near the solidifyable material carrier/provider or its support structure, and/or in or at the building region, and/or particularly in or at the object carrier or its support structure. A pressure or a strain being too high or too low, or a contact pressure, a fluid pressure and a material flowability respectively being too high or too low respectively in, at or near the solidifyable material carrier/provider and/or in or at the building region and/or in or at the object carrier may impair the building process. These conditions may also damage components of the three-dimensional object producing device, for example the solidifyable material provider such as a flexible and/or clear and/or resilient film/foil or a vat or container, or they may also damage already formed parts of the three-dimensional object under construction previously solidified by energy. Hence, by sensing or measuring anyone or a combination of the aforementioned critical conditions occurring in or at the building region and/or in or at the object carrier and/or in or at the solidifiable material carrier/provider, and by providing a suitable sensor or group of sensors or a sensor array correspondingly in a device, a higher process reliability and less damages to the device or the previously formed part of the three-dimensional object can be effectively realized, which contributes to significant improvements of the whole system. Moreover, the concept of the present invention allows to determine whether any undesired object (such as an impurity or a third undesired component) or subject (such as fingers of an operator) is erroneously placed at positions sensitive to the building process, e.g. between solidifyable material carrier/provider and previously solidified material, or whether an inadvertent tear-off or partial tear-off has occurred during the building process.

The aforementioned explanations apply not only for the situation when solidifyable material is provided at least in a building region, but do apply also when there is a step of separation, for example separating just solidified material from a yet unsolidified material, or separating solidified material from the solidifyable material carrier/provider, or from the object carrier, or from another element present in or close to the building region or the solidifyalbe material carrier or the object carrier and being partly or temporarily bonded or adhered or chemically cross linked to the just solidified material.

Suitably, pressure or stress can be measured or sensed by a pressure sensor, strain can be sensed or measured by a strain sensor, and material flowability can be sensed or measured by a flowmeter or a flow sensing device. The terms "strain" or "strain sensor" may be synonymous to "stress" or "stress sensor" to be applied according to the present invention. For example, suitable sensors are force sensors such as a piezoelectric device, a strain gauge, a differential pressure sensor, a touch sensor or any other known or developed pressure or strain sensor. Suitable types of pressure sensors or material flowability sensors are further those applied in injection moulding devices. Alternatively, sensing or measuring a displacement or deformation of an element provided in or at or close to the building region/plane, preferably a flexible solidifyable material film/foil or a separation film/foil having by itself a function in the building process, may provide an indirect sense or measure of a pressure, stress or strain according to the present invention. That is, deformation of such a flexible and/or clear and/or or foil film/foil under increase of pressure and strain will lead to a corresponding displacement from the original plane, measurable by a suitable displacement detection device such as a camera, a bar code based displacement detector, or the like. According to the present invention, one or more sensors, a group of sensors such as multiple sensors arranged in a line or distributed at several points of interest, or a sensor array may be employed. Similar explanations apply to sensing in or at the object carrier, in or at the building region/plane, as well as in or at the solidifyable material provider/carrier. A particularly suitable location of the respective sensor or sensors is at any position of a frame carrying or supporting the object carrier.

The aforementioned sensor can thus be provided at a location indicative of, or effective for, the respective condition to be sensed, measured or controlled/adjusted as mentioned above.

By using a suitable sensor, a combination of suitable sensors, or by using controller and corresponding acting means, both global and local statuses of the specified condition can be advantageously sensed, measured and/or adjusted/controlled in or at the building region, and/or in or at the object carrier and/or in or at the solidifyable material carrier/provider or their respective frame structures.

Pressure sensors have been described in technical fields, situations and purposes distinct from the present invention. For example, US 2005/0208168 mentions use of a pressure sensing mechanism in a situation of heating, on a separate second heating pad, of layers already previously formed by printing powdery material, and EP 1674243A describes use of a sensor to indicate contact of a roller with a material layer or to determine the contour of the layer dispensed and thus already previously printed from a printing head of a three-dimensional printing system, but none of these documents is concerned with sensing and/or measuring any one of pressure, strain, contact pressure, fluid pressure or flowability in a critical status dealt with according to the present invention where a building region is located between an object carrier or previously solidified material carried thereon, and a solidifyable material carrier/provider.

According to the invention, a device for supply of energy like a radiation source may be any type of device capable of solidifying the solidifyable material by synergistic stimulation or electromagnetic energy. For example, a suitable device for supply of radiation energy is an image projector with a suitable source of light or another wavelength emitter, or a laser system, or an LED system. Radiation can be supplied to the building region by means of further suitable components, such as but not limited to optical elements, lenses, shutters, voxel matrix projectors, bitmap generating or mask projectors, mirrors and multi-mirror elements, and the like. Example of suitable radiation techniques include, but are not limited to spacial light modulators (SLMs), projection units on the basis of DLP®, DMD®, LCD, ILA®, LCOS, SXRD etc., reflective and transmissive LCDs, LEDs or laser diodes emitted in lines or in a matrix, light valves, MEMs, laser systems, etc.

Many suitable arrangements of the device for supply of radiation energy are possible, including one where it supplies energy from above the building region or a solidifyable material carrier/provider (in which case the object carrier is usually placed below the building region or a solidifyable material carrier/provider), or one where it supplies energy from below the building region or a solidifyable material carrier/provider (in which case the object carrier is usually placed above the building region or a solidifyable material carrier/provider).

An advantage of the present invention is based on the fact that, due to the sensing or measurement of a critical condition as explained above, the variability of solidifyable materials usable for a certain type of 3D object producing device instantly used is enlarged. Examples of solidifyable materials include, but are not limited to liquid, fluid, thixotrophic, solid, semi-solid, high-viscous, medium-viscous and low-viscous materials, powder materials, and composite materials with a matrix and particulate matter dispersed therein. A common property of the material is, that it is solidifyable by the action of an energy source, such as a radiation source described above. Solidification may be performed by active radiation directly, such as in case of photo-hardenable polymers, or indirectly through heat produced by the energy supply, such as in case of co-melting or co-sintering of heat-meltable, -fusable or -sinterable materials. For example, suitable materials include, but are not limited to photo-hardening polymers, heat-sensitive polymers, polymer particle or beads, heat-sensitive materials such as waxes or wax-like substances, co-sinterable or -fuseable ceramic particles, and co-sinterable or -fuseable metal or metal alloy particles, or composites or combinations of the afore mentioned materials. Besides a solidifyable component, the solidifyable material may contain any further auxiliary additives as desired, such as fillers, colorants, wetting agents, or any other functional or inert substance. Depending on the 3D object producing technology and/or depending on the type of energy supply used, the concept of the present invention provides the benefit of selecting more sensitive or more robust materials as the case may be, and the critical conditions of pressure, strain and/or material flowability can be sensed or measured and subsequently adjusted depending on the chosen option(s).

The solidifyable material carrier/provider may also be embodied in known or suitably adapted ways. Its function is to carry or provide solidifyable material at least in a building region where solidifyable material is to be solidified by the action of energy, such as radiation. In relation to the object carrier, there may be a vertical or a transversal movement towards each other, or away from each other by a suitable guiding or movement mechanism, respectively. In the step of providing solidifyable material to the building region, the object carrier and the solidifyable material provider will typically adopt positions and orientations facing each other. In particular, the respective main planes of both the object carrier (which is, for example, the main plane of one or more platforms) and the solidifyable material carrier/provider actually are, or will be set coplanar to each other as well as to the building region. A transversal or particularly a vertical movement of either the object carrier or the solidifyable material provider, or both, for the purpose of providing solidifyable material in the building region will lead normally to an increase in pressure and/or decrease of material flowability, or to an increase in strain in or at the building region to be sensed or measured according to the present invention. Therefore, the relevant conditions sensed or measured according to the present invention occur when the object carrier, optionally comprising object structures previously solidified, presses against the solidifyable material carried or provided, or vice versa when the solidifyable material carrier/provider with its material put in place is pressed against the object carrier or the already solidified object structure carried thereon. After the material has been solidified by the action of the radiation or synergistic stimulation, the step of separating the solidified material in a vertical, transversal or tilted movement will in turn bring about effects on pressure or stress, strain and/or reflow and thus flowability of fresh solidifyable material in or at the building region, which may again be sensed or measured according to the invention if desired.

Suitable examples for a solidifyable material carrier/provider to be used in the present invention include, but are not limited to a container or vat containing the solidifyable material, or a flexible and/or clear and/or resilient film/foil conveying the solidifyable material. When embodied as a film, the solidified material may then be transferred by film transfer imaging techniques. Larger volumes of solidifyable material may be stored and supplied from a reservoir or solidifyable material cartridge to be conveyed to the solidifyable material provider.

The concept of the present invention involving sensing, measuring and/or adjusting one or more of the conditions described above provides, directly or indirectly, actively or passively a measure on factors, which in turn may be critical alone or in combination for the building process of the three-dimensional object. Sensing, measuring and/or adjusting one or more of the afore-mentioned conditions is preferably used to control at least one of the following process parameters:

(a) A distance, possibly a moving distance between the object carrier and the building region or between the object carrier and the surface (such as, e.g., a main plane) of the solidifyable material carrier/provider. By sensing or measuring the condition described above, it is possible to detect or determine as to whether or when the object carrier (possibly already carrying previously solidified material) has reached the surface of the solidifyable material or the surface (e.g. the main plane) of the solidifyable material carrier/provider containing or carrying the material, or vice versa in case that the position of the object carrier is fixed while the solidifyable material provider is moved. According to a further preferred embodiment, it allows a detection and control whether a real occurring, in relation to a nominally set, positional relationship between object carrier and solidifyable material or solidifyable material provider is in agreement. And if there is no such agreement or not within a predetermined tolerance range, it can be corrected such that the real positional relationship is adjusted to the one nominally set. Furthermore, this control mechanism allows for an adjustment to a certain system depending on the use of a particular solidifyable material provider, for example vats having different bottom plate thicknesses, or material carrying flexible and/or clear and/or resilient films/foils having different thicknesses. Further, this mechanism allows for a securing control whether a previously produced three-dimensional object was forgotten to be removed, or whether remainders of previously formed three-dimensional objects or falsely produced partial structures of solidified material still existed unintentionally. Control and correction in this manner improves reliability, as components of the system such as a vat or a flexible and/or clear and/or resilient film/foil used as the solidifyable material provider are less likely to be damaged.

(b) A pressure force of either the object carrier or the solidifyable material carrier/provider, respectively, towards the building region is controlled and/or adjusted. In this way, an improved or optimal compaction pressure provided at least in the building region can be determined and controlled, i.e. solidifyable material sandwiched between the solidifyable material carrier/provider and the object carrier (or the previously solidified material carried thereon) can be set in an optimal condition. This mechanism is particularly preferred when using solidifyable materials which are relatively viscous, thixotrophic, or have a particulate or composite nature. Pressure force or degree of compaction can be optimally adapted to the type of material or the type of production system. According to a further beneficial embodiment, control and/or adjustment of pressure force allows to detect whether and when a squeezing of solidifyable material out of the overlapping area between object carrier or previously solidified material, on the one hand, and solidifyable material provider, on the other hand, is terminated and therefore a radiation period can be started. This allows advantageous features, such as minimization of dead times, and optimised adaptation to the properties and compositions of the solidifyable material.

(c) Control and/or adjustment of a degree of inserting an object carrier, which has a gradually growing size in Z (vertical) direction of a three-dimensional object (possibly in partial or multiple structures) placed thereon, into the solidifyable material is provided. This mechanism allows for an optimised pre-set condition for a subsequent energy supply or radiation step. It further allows to take account of previously solidified material actually formed, distinct or independently from the previously nominally said build parameters.

(d) Control or adjustment of a separation force of either the object carrier or the solidifyable material carrier/provider, respectively, from the building region. This mechanism is applicable to a separation step when the object carrier, or when the solidifyable material carrier/provider respectively is actively moved vertically or transversally while the other component may be fixed in place, or when both components are actively moved. Alternatively, one of both, or none of both the object carrier and the solidifyable material carrier/provider is actively moved, but is passively moved or tilted with respect to the building region. In other embodiments, separation force is controlled and/or adjusted by other means or elements, without the object carrier and/or the solidifyable material carrier/provider being actively moved. One such example is provided under embodiment (e) below.

This mechanism beneficially allows for a proper control of separation force after a radiation period is terminated or interrupted, and when the solidified material shall be separated from the building region to allow next provision of fresh solidifyable material into the building region. In a preferred embodiment, separation force is controlled in a variable manner during the separation process, more preferably setting a relatively high separation force at the start of separation while decreasing the separation force during the further separation process. Further, control or adjustment of separation force allows to apply a more gentle and beneficially optimised adjustment of separation force depending on the structure of the just solidified material. For example, more delicate or fine structures will be sensed by a relatively low strain, which subsequently allows for adjusting a relatively low separation force, whereas in turn bulk or massy structures of solidified material will be sensed or measured by a relatively high strain and subsequently allows to said relatively high separation force during the separation process. In this manner, separation forces may be changed during a separation process. This embodiment leads to an advantage that more delicate and fine structures are less likely to be damaged during a separation period.

(e) Control and/or adjustment of fluid pressure in or at the building region. The fluid pressure may be caused by solidifying material provided by the solidifyable material carrier/provider, and it can be adjusted by a controlled injection of fluid solidifyable material into a vat or container as the solidifyable material carrier/provider, or by a controlled efflux of fluid solidifyable material out of a vat or container. Alternatively, it can be adjusted by a controlled injection or evacuation of any other fluid or gaseous substance between a just solidified material and a separation surface or film/foil, or on a side of a separation surface or film/foil opposite to the just solidified material.

(f) Control and/or adjustment of moving speed of the object carrier or the solidifyable material carrier/provider, respectively, in a direction towards, or in a direction away from the building region. This mechanism likewise applies to cases including one where the object carrier is moved, or the solidifyable material carrier/provider is moved, or both components are moved actively vertically and/or transversally in relation to each other. Moving speed in direction towards the building region is relevant, when solidifyable material is provided into the building region, and moving speed in a direction away is relevant for the period when solidified material is taken away from the building region in a separation process. This mechanism provides an advantageous feature, that moving speed in the step of providing the solidifyable material and/or in the step of separating solidified material, can be optimised and maximalized depending on the material and/or the structure to be solidified or to be separated, respectively.

(g) Control and/or adjustment of a tensile load of a solidifyable material carrier/provider. This mechanism is preferably applied to cases where the solidifyable material provider is a film/foil carrier or a separation film/foil, but it is applicable basically also in other cases of e.g. using a vat or container. For example, a film/foil can be mounted on or clamped in a frame at a variable tensile load or force. The tensile load can thus be controlled and/or adjusted. A tensile load allows for an adaptation to a respective building system, such as a type of 3D-object to be produced and a type or constitution of the solidifyable material, and allows for a more gentle treatment of a solidifyable material carrier/provider such as a film/foil carrier, or of a separation film/foil involving an actually optimised load, thereby contributing to an overall improved reliability of the system. According to a preferred embodiment, control and/or adjustment of tensile load is used to automatically adjust and more preferably maximize the speed of separation, while minimizing the occurrence of tear-off of solidified material structures, because separation forces can be suitably adjusted. Further, this mechanism allows for a determination or detection whether or when an inadvertent tear-off of already solidified material from the object carrier has occurred, and the whole building process may be stopped at this time, thereby saving consumption of further solidifyable material for a defective three-dimensional object.

(h) Control and/or adjustment of a coplanarity, or of a tilt angle between the surface of an object carrier and a surface (such as, e.g. a main plane) of the solidifyable material carrier/provider. This mechanism is particularly useful depending of the period of the whole building process: during radiation periods for solidification, coplanarity is preferred, whereas during a separation period, it may be preferable to apply, at least temporarily, a predetermined or a variable tilt angle in order to adjust or enhance separation forces in a separation step, and/or to adjust contact pressure forces in a step of bringing fresh solidifyable material to the building region. Adjustment and/or control of co-planarity or tilt angle can be performed by a suitable distribution of pressure sensors and using their measured values to ensure either co-planarity or a certain tilt angle as desired. This mechanism may include an embodiment where either the object carrier or the solidifyable material provider, or both of the are actively tilted in a controlled manner.

This embodiment may be advantageously applied to realize fine tuning in favour of process speed, reliability and careful treatment of delicate structures, or the like: a normal default setting would operate with coplanar surfaces, whereas in a separation step, the tilting mechanism is put on not before a sensed or measure strain reaches a certain, prescribed threshold. Conversely, in a contacting step, the involved surfaces are tilted first but are put in mutually coplanar fashion, optionally in a gradual manner, when a sensor senses or measures that pressure reaches a certain, prescribed threshold.

After a separation step is completed, coplanarity of surfaces may be reinstituted. Alternatively, the tilted arrangement can be maintained until again a contact for the next solidification step is sensed again.

(i) Control and/or adjustment of rolling away, or of gliding away the solidifyable material provider from a build area. This mechanism is advantageously applicable for the separation process, and more preferably when using a carrier film/foil to be rolled away or using a carrier plate to be glided away in a horizontal movement transverse to the orientation of the main plane of the object carrier (and thereby from the main plane of the previously solidified material of the three-dimensional object). For example, the action of rolling away or gliding away can be slowed down as long as the carrier film or carrier foil or carrier plate or carrier surface is still in contact with the solidified material or still overlaps with the build area, while is accelerated thereafter, in order to adjust and optimise the overall separation speed. At the same time, separation forces can be controlled by this mechanism to treat fine structures more gently, while allowing to treat rough or bulk structure more harshly.

It is noted that each of the above described control or adjustment means or mechanisms (a) to (i) can be applied individually alone, or can be applied in any desired combination. Further, each of the above described control or adjustment means or mechanisms (a) to (i) can be omitted or dispensed with, if desired. In the various embodiments of parameters (a) to (i) defined above, the object carrier may be suitably designed as an object carrier platform.

According to another embodiment, sensing or measuring one or more of the above specified conditions may be advantageously used to determine whether a building process is disturbed, for example whether any undesired object (such as an impurity or a third undesired component) or subject (such as fingers of an operator) is erroneously placed at positions sensitive to the building process, e.g. between solidifyable material carrier/provider and previously solidified material, or whether an inadvertent tear-off or partial tear-off has occurred during the building process. A sensing mechanism provided by the present invention allows then to react to such situations, for example by interrupting or terminating the building process, or by outputting a suitable alarm signal. One or more of the aforementioned control and/or adjustment means or mechanisms (a) to (i) and/or the aforementioned determination of disturbance may be performed by one or more suitably selected sensors, respectively, and may be controlled by one or more control units.

Furthermore, it is noted that the person skilled in the art can chose appropriate technical means for control and/or adjustment of the above described process parameters, including for example motors, agitators, pressing devices or pulling equipments, gliding devices with respectively applicable sensing or metering systems, without being limited thereto.

As the sensing, measurement or adjustment control according to the invention shall be indicative for the respective condition at the building region, the corresponding at least one sensor is preferably provided at a location at least at a region selected from: in or at the building region, in or at the object carrier, in or at the solidifyable material carrier/provider, in or at the frame carrying the solidifyable material carrier/provider, and preferably in or at the frame carrying the object carrier. The embodiments involving provision at the mentioned carrying frames are beneficial in terms of ease and cheapness of attachment or incorporation of the sensor(s) and manageability of the sensor(s). It has been surprisingly found that sensors at the location of carrying frames are sufficiently sensitive to be indicative for the conditions of pressure and strain in the building region and correspondingly the separation region.

The description above is mainly related to the concept of the invention by sensing or measuring the mentioned conditions under an actual working or building process. In another embodiment, these real values determined by a measurement at least one of pressure, stress, strain, contact pressure, fluid pressure and/or material flowability is compared with previously nominally set process parameters. Such a nominal setting of process parameters constitutes a useful embodiment of its own, which can be advantageously applied to a preparation process for preparing a production process of at least one three-dimensional object by solidifying a solidifyable material, as will be described in further detail in the following.

According to another embodiment of the present invention, nominally setting of process parameters on the basis of build data is performed on its own in order to control in advance, i.e. separately before an actual working or build process begins, at least one of the process parameters defined above under items (a) to (i)—alone or in combination—depending on structures of the at least one three-dimensional object to be produced or depending on the material chosen as the solidifyable material. Information on these nominally set process parameters can then advantageously be outputted to, or supplied to a three-dimensional object producing device for execution, thereby producing the three-dimensional object. Mainly depending on the structures to be solidified, such as an area size or shape in the build area or building region to be solidified at a time or, alternatively, depending on whether auxiliary support structures or proper 3D object structures are to be solidified, said process parameters can be varied effectively during a build process. In a more preferred embodiment, comparison between said nominally set process parameters and real values determined by the measurement of pressure or stress, strain, contact pressure and/or material flowability existing in or at or close to the building region is continuously performed during the build process, and the real values obtained are then used to control or adjust the process parameters listed above under items (a) to (i), in order to fit again or adjust within a predetermined tolerance range to the nominally preset process parameters. In this manner, proper real-time adjustment can be performed, and the reliability of the whole process and avoidance of defects can be further improved.

According to another embodiment useful of its own and therefore applicable not only in combination with the actual sensing or measuring of a condition of pressure and/or strain as described above, but also independently therefrom, relates to a process and device for producing a three-dimensional object of a type involving radiation source, object carrier and solidifyable material carrier/provider, wherein a contact pressure, a fluid pressure and/or a flowability of solidifyable material occurring in or at the building region is sensed and/or adjusted. These critical factors may be sensed and/or adjusted by a manner how solidifying material is provided by the solidifyable material carrier/provider, or by further influencing means. Preferably, any one of these critical factors is changed during the building process, preferably in any one of the steps (i) when solidifyable material is provided to the building region and/or solidifyable material carrier, (ii) in advance or during supply of energy and/or (iii) during a step of separating solidified material from the building region and/or solidifyable material carrier. Preferably, these critical factors of contact pressure, a fluid pressure and/or a flowability may be controlled and/or adjusted by anyone of the means or mechanisms (a) to (i) described above. As a further preferred example, these factors can be adjusted by a controlled injection of further fluid solidifyable material into a vat or container as the solidifyable material carrier/provider, or by a controlled efflux of fluid solidifyable material out of a vat or container, to thereby increase or decrease fluid pressure, respectively. According to a further preferred embodiment, a biased separation force between a solidified material and a reference or separation film/foil can be controlled and/or adjusted by the provision of fluid pressure or flowability of fresh solidifyable material. This leads to an advantage that a further separation force Provided by an additional active separation activity between object carrier and solidifyable material provider can be decreased, that dead times and separation times can be significantly reduced, and that the length or extend of a separation movement can be reduced as well.

Alternatively, the factors of contact pressure, fluid pressure and/or flowability of solidifyable material can be adjusted by a pre-heating treatment of solidifyable material at an appropriate time and/or location during or, preferably, in advance of supplying energy for solidification. As an example, there may be mentioned a previous provision of a solid, a semi-solid or a relatively highly viscous solidifyable material, which upon heating will be converted into a corresponding, relatively more flowable material, which in turn influences contact pressure and/or fluid pressure. As a particular example suitable for this purpose, a photosensitive wax material or wax-like material may be mentioned.

If desired, the aforementioned factors of contact pressure, fluid pressure and/or flowability may be varied with respect to either one of their values during a critical step of a build process, in particular when solidfyable material is contacted with the object carrier or the previously solidified material formed thereon. Variation of any one of their values is assisted by sensing pressure and/or strain in or at the building region or in or at the object carrier, and can be controlled or adjusted by changing any one of the process parameters (a) to (i) described above.

BRIEF DESCRIPTION OF THE FIGURES

In the following, the principle, objects, advantageous features and preferred embodiments will be described in more detail while referring to the attached drawings, noting however that the present invention is not limited thereto. In the drawings, same reference signs denote same or corresponding elements.

FIGS. 5A and 5B schematically show, partially as sectional views, a process and a device for producing a three-dimensional object according to still another embodiment of the present invention, wherein FIG. 5B details a particular tilting mechanism;

FIGS. 9A, 9B, 9C and 9D schematically show a process and a device for producing a three-dimensional object according to a still further embodiment of the present invention using a low vat or film-generating device as a solidifyable material carrier/provider and another particular sensing mechanism attached to or incorporated into a frame carrying an object carrier.

DETAILED DESCRIPTION

Figure 1:
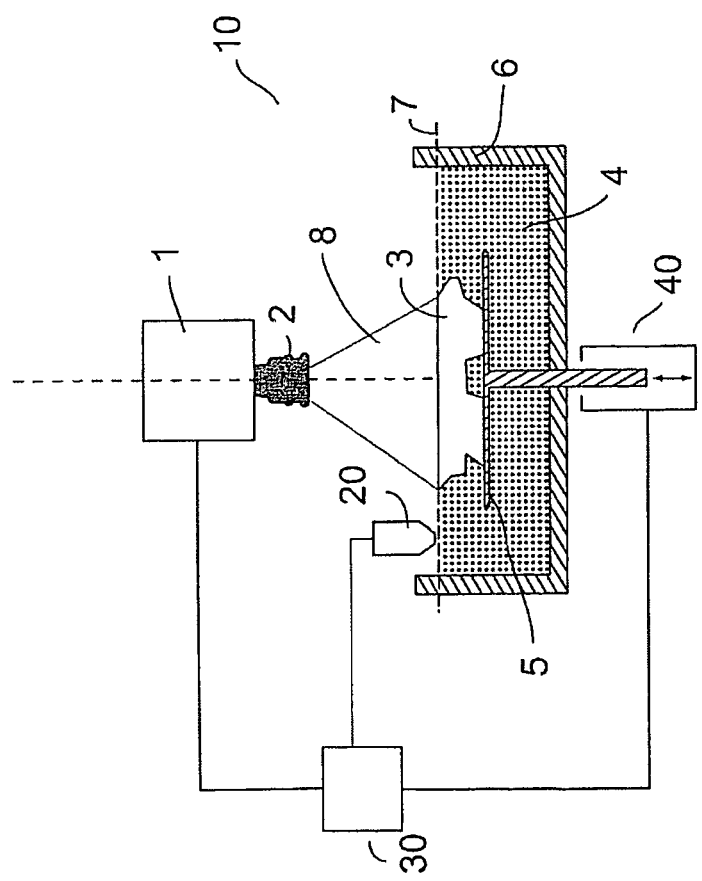
FIG. 1 schematically shows, partially as in a sectional view, a process and a device for producing a three-dimensional object according to an embodiment of the present invention.

In FIG. 1, there is schematically shown a basic device according to a first embodiment of the present invention for producing a three-dimensional object, including a three-dimensional object producing device 10, a sensor 20 arranged to sense or measure pressure and/or strain, a control unit 30 and an agitator 40. The three-dimensional object producing device 10 includes a radiation source and projection unit 1 with an imaging optic 2 provided above a basin or container or vat 6 being filled with photo-hardening material 4 to solidify object 3 either step-by-step in the form of a bitmap mask, a voxel matrix, or continuously in portions as desired. Alternatively, object 3 may be formed layer-wise. Radiation is illuminated into a building plane 7 to solidify solidifyable material in a desired area or a partial built area, thereby forming a building region. Sensor 20 is capable of sensing or measuring either pressure or strain within the building plane 7, for example by sensing upon a flexible film/foil which is placed in the building or solidification area and which may serve both as a reference plane or reference area (not necessarily flat) and as a separation film/foil.

By the action of agitator 40, the object carrier 5 can be moved upward and downward under control of control unit 30 (schematically illustrated by the double arrow). When the object carrier 5 is moved upward, either in the beginning without solidified material or later having already solidified material carried thereon, there will occur an increase in pressure and strain applied to the flexible and/or clear and/or resilient film/foil in the building or solidification area 7 during the step of providing solidifyable material at least in the building or solidification area, which pressure and/or strain will be sensed or measured by sensor 20. The resulting measured value will be outputted to control unit 30, which in turn outputs an appropriate signal to agitator 40 in order to adjust at least one of process parameters, including but not limited to (i) distance of upper surface of the main plane of platform 5 or of previously solidified material surface on the one hand, and building plane 7 on the other hand, (ii) moving speed of the platform 5 towards building plane 7. Then, solidifying material sandwiched between the previously solidified upper surface of object 3 and building plane 7 will be solidified through the action of radiation, predominantly or only in a projection area 8. Then, when performing a separation process, agitator 40 is allowed to act on platform 5 to be moved downward, while an increasing strain is sensed or measured by sensor 20, which measured or sensed value(s) will be outputted to control unit 30 for feed-back control of agitator 40 and thereby for controlling or adjusting (i) separation force, (ii) moving speed of the platform 5 away from the building plane 7, or (iii) other process parameters described above.

The aforementioned steps can be continuously or intermittently proceeded further, thereby producing a desired three-dimensional object.

The embodiment in FIG. 1 can be modified while using the same concept of the invention. For example, instead of one pressure and/or strain sensor 20 being illustrated in FIG. 1, a multitude of sensors and preferably sensors arranged in a line or a matrix, and in particular a sensor array may be advantageously used. In this manner, the critical conditions can be sensed or measured both generally and locally in the desired plane, and a ratio between general and local values on pressure and/or strain can be beneficially determined in order to obtain more fine and precise results.

As another alternative modification of the embodiment shown in FIG. 1, instead of pressure and/or strain sensor(s) 20 a displacement detection device (not shown), such as a camera or a bar code displacement detector may be used to sense or measure pressure and/or strain existing in or at the building or solidification area. In another embodiment, an agitator or multiple agitators acting an platform 5 serve to produce a tilt angle, or to adjust coplanarity between the upper surface of platform 5 or the previously formed solidified material surface and the main (horizontal) plane of the flexible and/or clear and/or resilient film/foil placed within the building plane or solidification area 7.

According to another alternative modification of the embodiment shown in FIG. 1, one or more pressure and/or strain sensor(s) 20 or a sensor matrix or array is provided in or at the object carrier 5. As an example corresponding to such an embodiment being illustrated in FIGS. 2A and 2B, there is provided one or more sensors at a modified object carrier. In this embodiment, the object carrier is embodied in the form of two platforms $5^1$ and $5^2$, between which an array of sensors $20''$ is distributed, wherein only two sensors $20^1$ and $20^2$ are shown in the sectional views of FIGS. 2A and 2B.

Figure 2A:
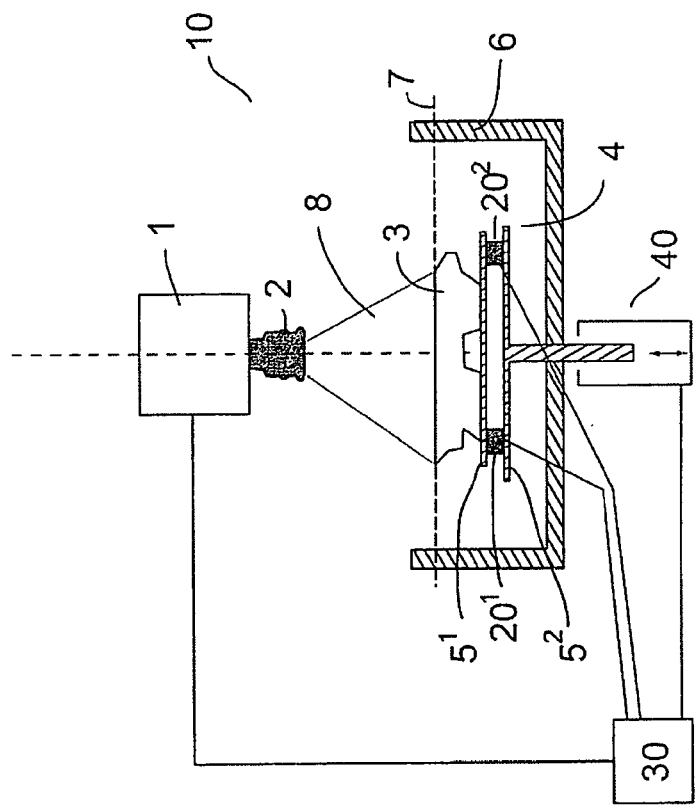
FIGS. 2A and 2B schematically show, partially in sectional views, a process and a device for producing a three-dimensional object according to another embodiment of the present invention.
Figure 2B:
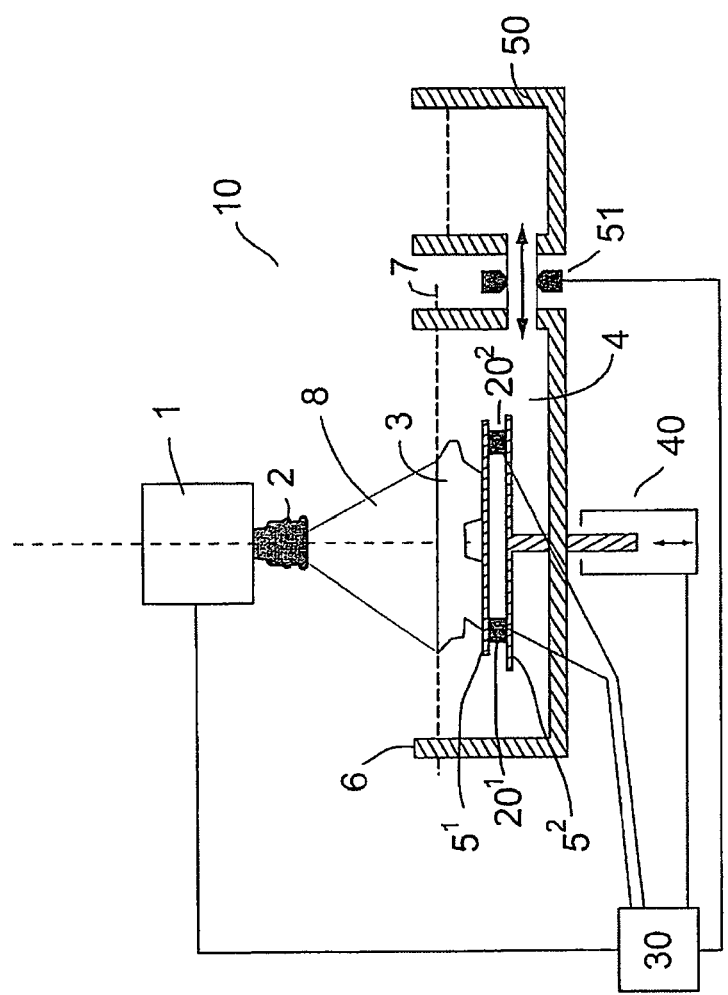
Figure 3:
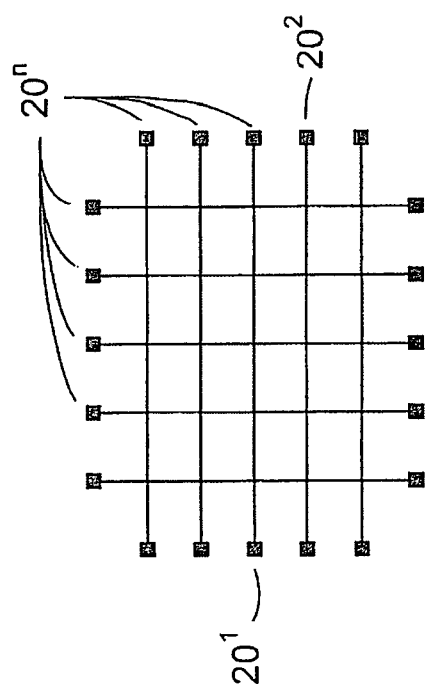
FIG. 3 schematically shows en example of a possible arrangement of a sensor array which can be used for sensing or measuring pressure and/or strain in preferred embodiments according to the present invention.

A more detailed view of a possible arrangement of an array of sensors $20''$ generally applicable to the embodiment of FIGS. 2A and 2B and to other embodiments is given by the plain view of FIG. 3. In this example, sensors $20''$ are arranged in the periphery of a building region such as a solidification area, but less sensors are possible, or further sensors can be provided, for example at the crossing points of connection lines of sensors $20''$ shown in FIG. 3. Sensors $20''$ are connected to a control unit through appropriate means for supplying the desired information.

As a possible further modification, the embodiment of FIG. 2B shows a separate reservoir for solidifyable material 50, from which solidifyable material can be injected into container or vat 6, or into which solidifyable material can be effluxed from container or vat 6, respectively under control of control unit 30 and controlled by valve and/or pump 51 (schematically is sulstrated by the double arrow at the connection between reservoir 50 and vat 6). In this manner, fluid pressure of solidifyable material in container or vat 6 and especially that occurring in the building plane or solidification area 7 being formed by a flexible and/or clear and/or resilient film/foil can be controlled and adjusted.

Figure 4:
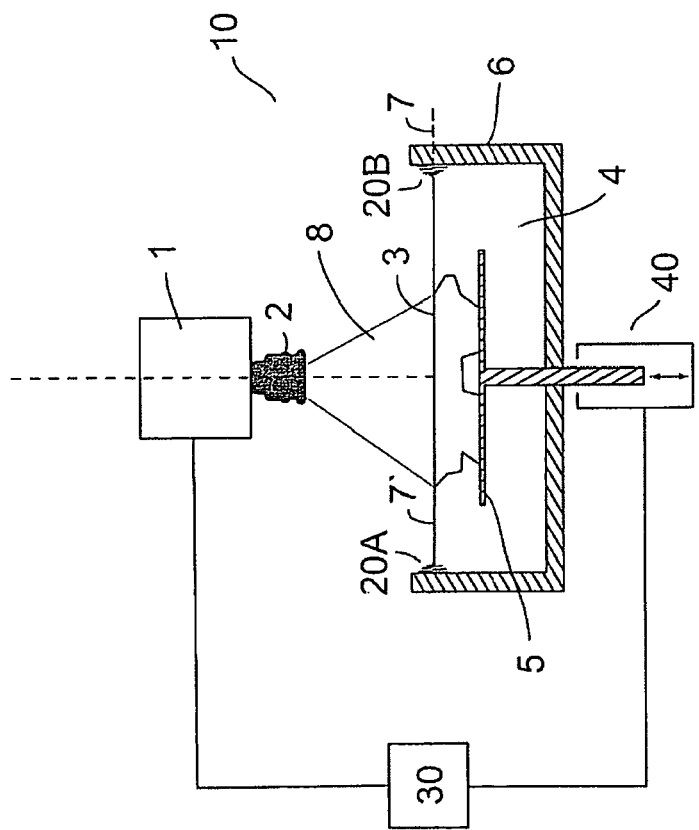
FIG. 4 schematically shows, partially as a sectional view, a process and a device for producing a three-dimensional object according to a further embodiment of the present invention.

According to an alternative embodiment shown in FIG. 4, there is provided, instead of pressure and/or strain sensor 20, either one or two strain sensors 20A, 20B capable of sensing or measuring stress and/or strain applied to a clear and/or flexible and/or resilient film/foil 7' being placed within the building plane or solidification area 7 and being mounted between sensors 20A/20B. One of both sensors 20A/20B could be also omitted, so that film/foil 7' is merely fixed at one side to a wall of container or vat 6. Similar to the embodiments shown or described in connection with the previous embodiments and their modifications, sensor(s) 20A/20B sense or measure a condition of pressure/stress and/or strain in situations of providing solidifyable material at least in a building plane for subsequent solidification through radiation, or in the situation of separating the just solidified material from the clear and/or flexible and/or resilient film/foil 7' and thereby from the building plane or solidification area 7. Likewise, the modifications described above in connection with the previous embodiment may also apply in the present embodiment. For example, a platform sensor array $20''$ for combined sensing of pressure and strain, and/or reservoir 50 under control of valve/pump 51 for adjustment of fluid pressure as shown in FIG. 2B may be used in addition.

Figure 5B:
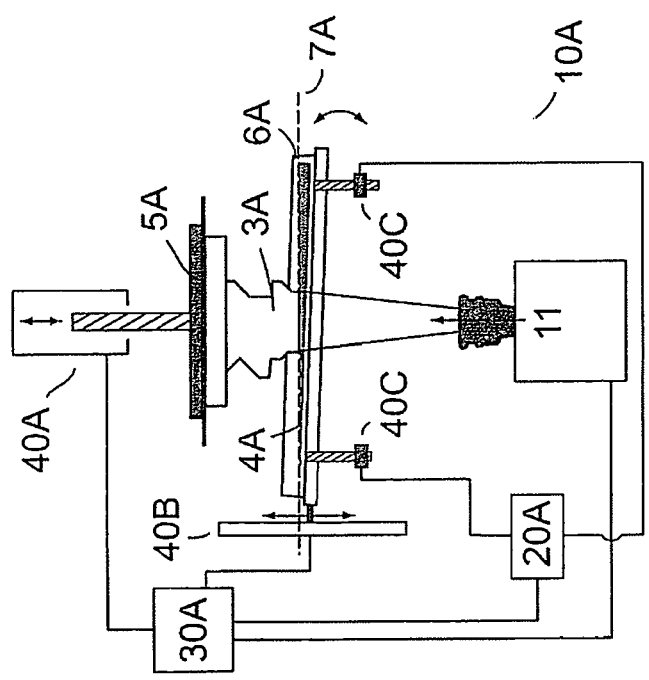

According to another embodiment as schematically shown in FIGS. 5A and 5B, there are provided a modified three-dimensional object producing device 10A and a modified type of sensors 20A. In this embodiment, the three-dimensional object producing device 10A includes a vat 6A accommodating a solidifyable material 4A at least in a building plane 7A, a transparent reference plane formed by glass plate 9, and an object carrier 5A which can be moved up and down through agitator 40A. Vat 6A and plate 9 can alternatively be integrally formed as one part. A radiation source 11, such as a focused laser beam or an UV lamp, serves to provide active radiation into building plane 7A to solidify solidifyable material 4A in a desired building region, thereby continuously or discontinuously forming three-dimensional object 3A. In the present embodiment, multiple pressure sensors 20A are provided by incorporation into an upper portion of the transparent reference plate 9, in order to sense or measure pressure and/or strain according to the present invention. The multiple pressure sensors 20A may be distributed in the transparent reference plate 9 in lines or in an array. If provided in an active build area, pressure sensors 20A should preferably be made transparent or essentially transparent. Values on pressure and/ or strain measured by sensors 20A are digitally outputted to control unit 30A, which in response transmits a signal to agitator 40A for upward or downward movement of object carrier 5A, depending on whether a step of providing solidifyable material is performed, or whether a step of separating solidified material from the building plane or solidification area 7A is performed, respectively. In a manner similar to the description of the previous embodiment and its modified forms, control unit 30A may thereby control and/or adjust distance between object carrier 5A and the bottom plane of that 6A, moving speed of object carrier 5A, and optionally further process parameters. Moreover, depending on the type and/or composition of a solidifyable material used, especially in terms of viscosity, presence or absence of particulate matter or powder, a degree of compaction may be controlled or adjusted also. As further shown in FIG. 5A, a further agitator 40B may optionally, or in place of agitator 40A, be provided for the relative movement of reference plate 9 and thereby of vat 6A. Thereby, relative vertical movements of agitators 40A or 40B, or both, can be performed in order to control and adjust desired process parameters. By way of operating agitator 40B, a tilt of plate 9 and thereby of vat 6 can be controlled and adjusted to a desired tilt angle with respect to the building plane 7A. Agitator 40B however can also be omitted. Alternatively, agitator 40A is constructed and arranged in such a manner as to localize and orient object carrier 5A at an appropriate horizontal level in Z direction, but also to orient it in a tilted way at an appropriate tilt angle with respect to building plane 7A.

In a further development of this embodiment, there is provided additionally one or more agitators 40C, as shown by two agitators in FIG. 5B. Controlled by control unit 30A and in response to sensing or measuring stress or strain in building plane 7A (or, generally, in a building region) during a separation step, a tilt angle between object carrier 5A (or the co-planar building plane 7A) and the main plane of the container or vat 6A is adjusted (illustrated by the double arrow). By means of agitators 40C, co-planarity can again be set after separation has been realised and when the object carrier 5A will again be moved upwards, whereupon solidified material is again brought into the building plane or building region for the subsequent solidification. In FIG. 5B, two agitators 40C are shown; however, it should be clear that one agitator for tilting is sufficient while the other end side of the plate 9 is fixed, or another number of agitators can be used, preferably four agitators located in or in the vicinity of all four corners of the transparent plate 9 in order to more finely adjust tilting action in the build area. The other components illustrated in FIG. 5B are the same as shown in FIG. 5A and can be optionally modified as described above.

Figure 6:
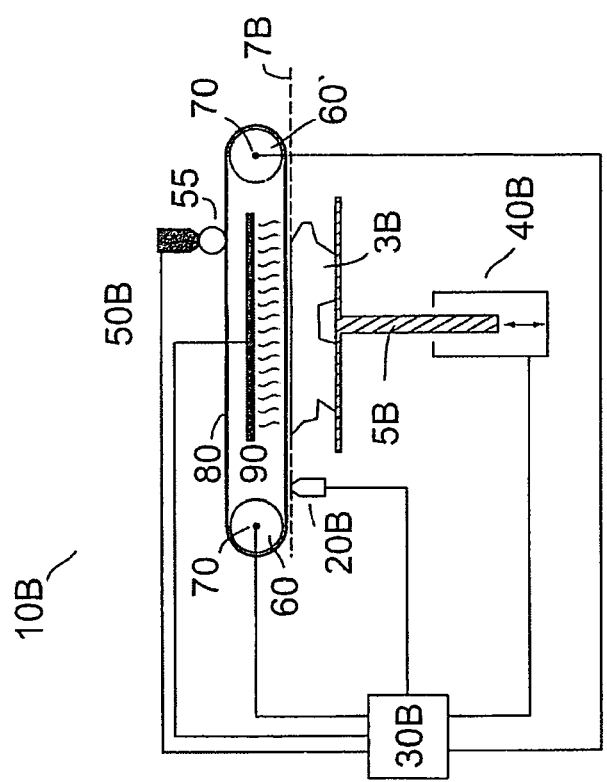
FIG. 6 schematically shows, partially as a sectional view, a process and a device for producing a three-dimensional object according to another embodiment of the present invention using a flexible and/or clear and/or resilient film/foil as a solidifyable material carrier/provider and particular sensing mechanisms.

In a further embodiment as illustrated in FIG. 6, a three-dimensional object producing device 10B designed for film transfer imaging is used for applying the concept of the present invention. In this embodiment, an endless belt 80 made of transparent and/or flexible and/resilient rubber/film/foil is used to provide solidifyable material, which is supplied from reservoir 50B through roller 55 in the form of a material layer to the building region or solidification area 7B by rotating rollers 60,60' in the same direction. Rollers 60,60' however can be independently controlled by control unit 30B to rotate not only in the same but also in different directions. When fresh solidifyable material is provided in the building or solidification area, object carrier 5B, without or having previously solidified object material 3B thereon, is pressed against the thus provided solidifyable material in the building plane 7B. A value of pressure or stress and/or strain occurring in the building or solidification area by means of this compression action from an upward movement of carrier 5B through agitator 40B is sensed by a sensor 20B or a group of suitable sensors (not shown) or a sensor array (not shown) sensing on the corresponding property of endless belt 80 of transparent and/or flexible and/resilient rubber/film/foil. In addition or, alternatively, instead of sensor 20B which may be omitted, there may be optionally provided other sensors 70 being incorporated into rollers 60,60' and thus forming part of the solidifyable material carrier system, in order to indirectly sense or measure a pressure and/or strain acting upon endless belt 80. One of the optional sensors 70 may be sufficient already to perform this function, while the other sensor(s) is/are omitted. When appropriate process parameters such as distance between upper surface of the previously formed object 3B and endless belt 80, moving speed between these positions, pressure force and/or tensile load of endless belt 80 are suitably controlled, radiation by means of radiation source 90 can be initiated to solidify solidifyable material provided in the building plane or region. During separation process, separation forces between the upper surface of the just solidified material of object 3B and the transparent and/or flexible and/or resilient film/foil of endless belt 80 is sensed by either sensor 20B or sensors 70, or both, and is subsequently controlled and adjusted by sensing and measuring pressure or stress and/or strain. For performing this, each of rollers 60,60' may be counter-rotated. Agitators, motors, rollers etc. are controlled by control unit 30B. Further, the process parameters are also controlled by control unit 30B in response to the conditions senses or measured by sensors 20B and/or 70.

Figure 7:
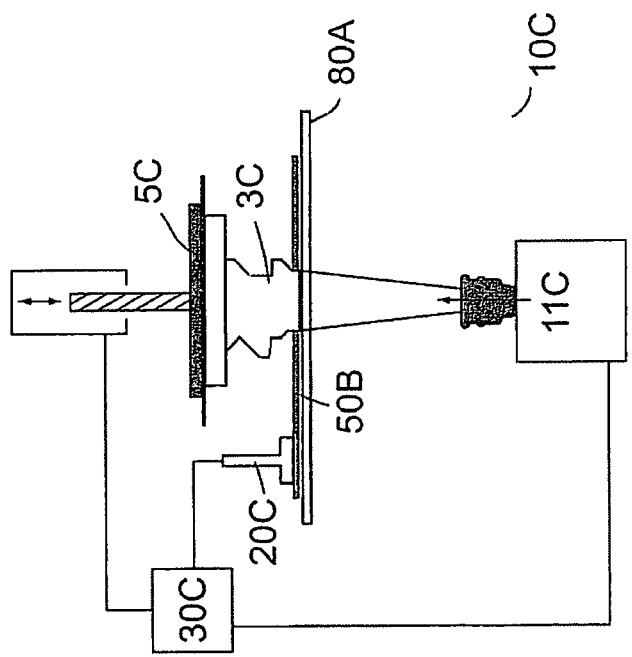
FIG. 7 schematically shows, partially as a sectional view, a process and a device for producing a three-dimensional object according to a still further embodiment of the present invention using also a flexible and/or clear and/or resilient film/foil as a solidifyable material carrier/provider and another particular sensing mechanism.

FIG. 7 shows another embodiment of the present invention for a process and a device for producing a three-dimensional object 10C, including a transparent and/or flexible and/or resilient film/foil 80A as a carrier/provider for solidifyable material 50B, an object carrier 5C carrying a previously formed part of object 3C. Under control of control unit 30C, the object carrier 5C can be moved upwards and downwards, as shown by the illustrated arrows. Radiation is provided from an appropriate radiation source 11C. In this embodiment, flowability of solidifyable material 50B is sensed or measured by appropriate flowmeter(s) or a flow sensing device(s), shown here by sensor 20C. In the case shown, sensor 20C is located outside the build area or building region for sensing or measuring general properties of solidifyable material throughout the building process, wherein measured or sensed values are outputted to control unit 30C for use in an adjustment or control of further process parameters. However, in cases not shown here, sensor 20C could be placed within a build area or building region, in order to sense or measure an actual flowability state of the solidifyable material, for example, in a step of providing the solidifyable material into the building plane, or in a step of separating solidified material from the building plane. Placement of sensor 20C within a build area or building region could be performed only temporarily, for example not during a radiation period. Further modifications are possible, for example, an additional use of a further sensor (not shown) sensing or measuring pressure and/or strain applied to transparent and/or flexible and/or resilient film/foil 80A during the building process (such as shown and described in connection with FIG. 6), thereby enabling control of a further process parameters as explained in connection with other embodiments above.

Figure 8:
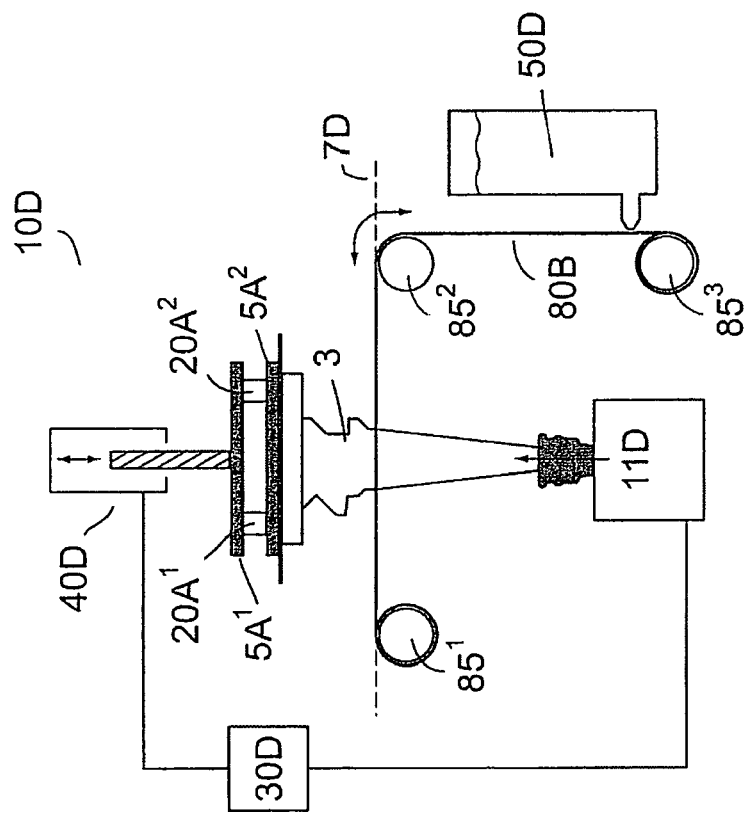
FIG. 8 schematically shows, partially as a sectional view, a process and a device for producing a three-dimensional object according to a still further embodiment of the present invention using also a flexible and/or clear and/or resilient film/foil as a solidifyable material carrier/provider and another particular sensing mechanism.

The embodiments shown in FIGS. 6 and 7 can be modified likewise as described before. Particular modifications are shown in FIG. 8 with respect to a process and a device for producing a three-dimensional object 10D. In this embodiment, an array of pressure sensor 20A" is arranged between an object carrier which is formed by two platforms $5A^1$ and $5A^2$, the former functioning as a basic plate and the latter functioning as a carrying plate actually carrying solidified object 3. The array of sensor 20A″ may be arranged as shown in FIG. 3 or in a different number or arrangement of multiple pressure sensors, in order to generally and/or locally sense pressure and/or strain occurring at the object carrier in a sensitive manner, which in turn is indicative for the pressure and/or the strain occurring in the building plane 7D. Agitator 40D is agitated to move platforms 5A1 and 5A2 upwards or downwards at an adjusted movement speed, under control of control unit 30D and partially in response to results on pressure values sensed by sensor array 20A″. A suitable radiation source provides energy 11D, for example through spatial light modulation (SLM), by a focused laser beam, or by a simultaneous or almost simultaneous light exposure, to the building plane indicated by reference sign 7D.

A further modification applied in this embodiment concerns a particular solidifying material carrier. Here, it is embodied in the form of a transparent and/or flexible and/or resilient film/foil 80B. The film is adapted to transport solidifying material, which is dispensed from a solidifying material reservoir 50D onto one side of the film, from a supply station to the building plane 7D and to the build area, to be subjected to radiation action. Transport may be carried out by an active roller $85^2$ under the control of control unit 30D, while other rollers $85^1$ and $85^3$ may be passive and merely roll up remaining ends of transparent flexible film 80B.

FIGS. 9A, 9B, 9C and 9D respectively show schematically various states of a still further embodiment of the present invention in which another particular sensing mechanism is attached to or incorporated into a frame carrying an object carrier. Specifically in this embodiment (reference signs used in FIG. 9A correspondingly apply to respective elements in FIGS. 9B and 9C) a flat vat or film-like device 600 is used as another type of solidifyable material carrier/provider, carrying or containing solidifyable material (not specifically denoted). The flat vat or film-like device 600 is carried on a table with agitators, optionally one (401) or two (401,402) in order to allow tilting mechanism. The object carrier 501, carrying the just processed object 301, is carried by a corresponding frame structure 502. Without being shown in more detail, the frame structure may be constituted by a vertical rod, which in turn may be supplemented by a further, U-shaped frame structure to improve stability of the object carrying system. The object carrier can be moved upward and downward by a suitable gliding mechanism exerted by a driving element (integrated into the frame structure 502, not shown), as indicated by a double arrow in FIG. 9A. As specifically shown in the present embodiment, a sensor 200 is attached to the frame carrying the object carrier, for example at the rod. Optionally and in order to enhance sensing capabilities, additional sensors may be attached also at one or more positions of the U-shape frame structure (not shown).

As shown in FIG. 9B, in the critical step of contact formation between the downward moving object carrier (indicated by a downward arrow) and the solidifyable material provided in the flat vat or film-like device 600—thereby forming the building region in which energy shall be supplied after the contacting process—, a back force F1 is generated as the contact force is formed and increased, which back force F1 in turn generates a force F2 acting upon the frame 502, and this force F2 is eventually sensed and optionally measured by sensor 200. The pressure sensed or measured is input into a controller (not shown), which in turn controls the driving element and thus the actual contact pressure applied onto the solidifying material or the upper surface of the vat or film-like device 600, depending on the sensed/measured pressure value. This mechanism allows careful control of a gentle contacting process and a carefully adjusted contact pressure between object carrier 501 (or the previously solidified object 301 carried on it) and the surface of the solidifying material or the upper surface of the vat or film-like device 600.

Figure 9A:
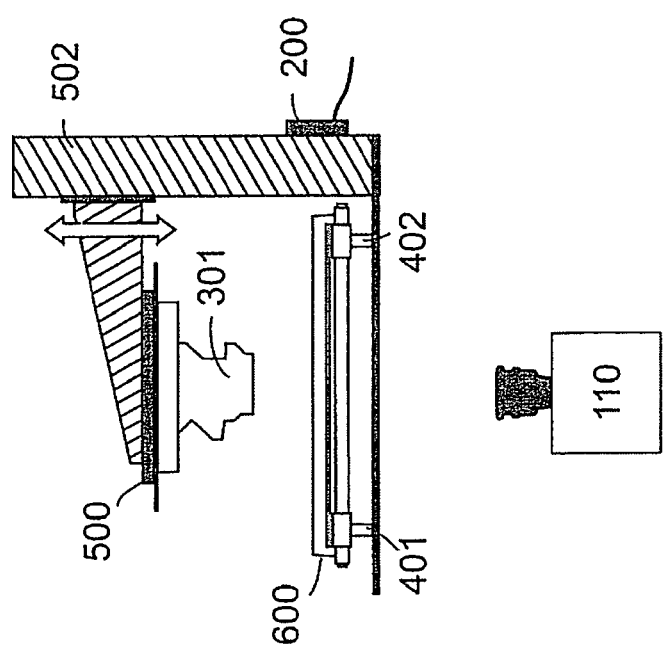
Figure 9C:
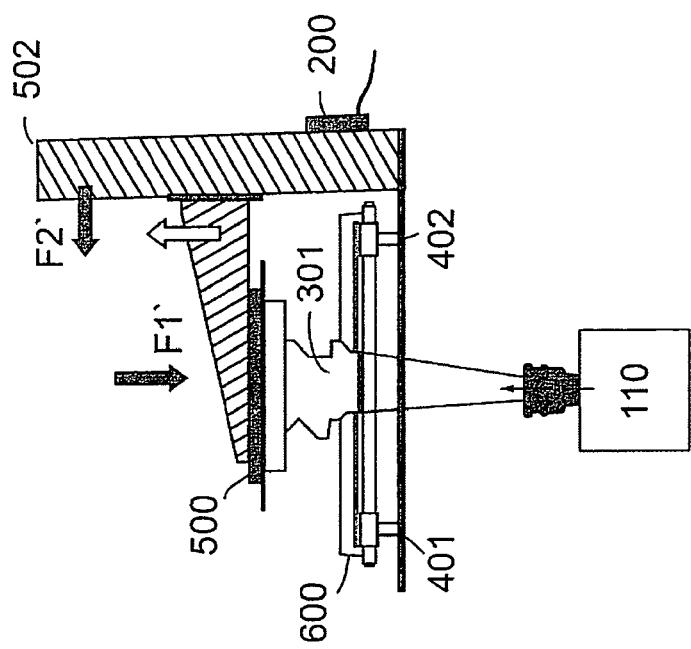

After solidification took place upon action of radiation source 110 during a defined period of time, the just solidified material, now adhering to the previously formed object 301, is separated from the vat or film-like device 600 (or remainders of unsolidified material) by moving the object carrier 500 upward, as indicated by an upward arrow in FIG. 9C. Adherence forces will generate a force F1′ directed downward, which in turn will generate F2′ acting again upon the frame 502, and this force F2′ is eventually sensed and optionally measured by sensor 200 again, but now with an opposite sign. This time, different from the contact processing, the strain sensed or measured is input into the controller (not shown), which now controls the driving element and its separation force applied, depending on the sensed/measured pressure value.

Figure 9D:
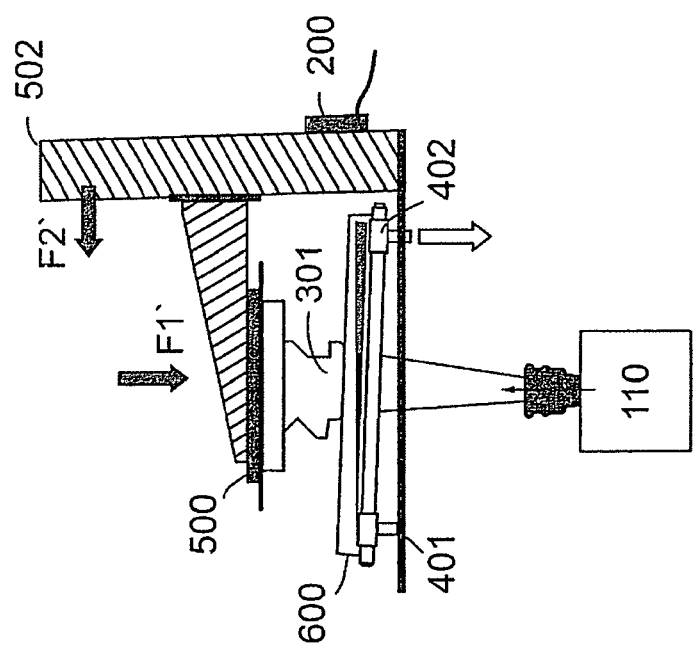

Independently from, or in addition to the separation process caused by an upward movement of the object carrier as shown in FIG. 9C, agitator 402 is activated to generate a tilting mechanism to tilt the vat or film-like device 600 for facilitating the separation process as shown in FIG. 9D, wherein the tilting movement is indicated by a downward arrow. As a consequence, similar forces F1′ and F2′ are generated by the adherence, which are likewise sensed and optionally measured by sensor 200. Feedback control via a controller (not shown) allows for a controlled and more accurate tilting mechanism. The sensing and control illustrated by FIGS. 9C and 9D can optionally and preferably combined by sensing and controlling both upward movement of the object carrier and the tilting mechanism via agitators 401 and/or 402. In a further preferred embodiment of such a combination, the agitators 401 and/or 402 are activated not before the strain value sensed/measured by the upward movement of object carrier 500 reaches a prescribed threshold.

It is noted that the present embodiments are illustrated and described specifically, while various modifications and variations are possible and can be applied by the person skilled in the art within the concept of the present invention. Moreover, individual features or certain components of the embodiments described above can be combined.

What is claimed is:

1. A device for producing at least one three-dimensional object from a solidifiable material, comprising:
    a source of solidification energy, wherein the source of solidification energy selectively provides solidification energy through a transparent plate to a building plane in a pattern corresponding to the three-dimensional object;
    an object carrier movable relative to the building plane;
    a source of the solidifiable material, wherein the source of solidifiable material provides solidifiable material to the building plane, and the building plane is between the object carrier and the source of solidification energy;
    a controller operative to adjust a relative tilt angle between the transparent plate and the building plane, and
    a sensor arranged to sense or measure a condition selected from the group consisting of (i) a force between the object carrier and the building plane, and (ii) a pressure between the object carrier and the building plane, wherein the controller is operatively connected to the sensor and is operative to adjust the relative tilt angle between the transparent plate and the building plane based on the sensed or measured condition.

2. The device of claim 1, wherein the sensor is arranged to sense or measure a separation force of the three-dimensional object from the building plane, and during an object separation operation, the controller adjusts the tilt angle such that the transparent plate and the building plane tilt relatively away from one another based on the sensed or measured separation force.

3. The device of claim 1, wherein the sensor is arranged to sense or measure a contact pressure between the object carrier and the building plane, and during an operation of providing solidifiable material to the building plane the controller adjusts the tilt angle such that the transparent plate and the building plane tilt relatively toward one another based on the sensed or measured contact pressure.

4. The device of claim 1, wherein the controller is operatively connected to the transparent plate to tilt the transparent plate.

5. The device of claim 1, wherein the source of the solidifiable material is a container that includes the transparent plate.

6. The device of claim 1, wherein the source of solidification energy comprises a laser diode.

7. The device of claim 6, wherein the laser diode emits solidification energy in lines.

8. The device of claim 1, wherein the source of solidification energy comprises one selected from a spatial light modulator and a digital light projector.

9. The device of claim 1, wherein the source of solidification energy is located beneath the transparent plate and selectively transmits solidification energy upward through the transparent plate to the building plane.

10. A method of producing at least one three-dimensional object from a solidifiable material, comprising:
supplying solidification energy through a transparent plate to solidifiable material in a building plane in a pattern corresponding to the three-dimensional object, thereby forming a portion of the at least one three-dimensional object on an object carrier, wherein the object carrier is movable relative to the building plane;
adjusting a relative tilt angle between the transparent plate and the building plane, and
sensing or measuring a condition selected from the group consisting of (i) a force between the object carrier and the building plane, and (ii) a pressure between the object carrier and the building plane, wherein the step of adjusting a relative tilt angle between the transparent plate and the building plane is executed by a controller configured to adjust the tilt angle based on the sensed or measured condition.

11. The method of claim 10, wherein the sensed or measured condition is a sensed or measured separation force between the object carrier and the building plane, and the step of adjusting a relative tilt angle between the transparent plate and the building plane comprises increasing the relative tilt angle based on the sensed or measured separation force.

12. The method of claim 10, wherein the sensed or measured condition is a sensed or measured contact pressure between the object carrier and the building plane, and the step of adjusting a relative tilt angle between the transparent plate and the building plane comprises decreasing the relative tilt angle based on the sensed or measured contact pressure.

13. The method of claim 10, further comprising: providing a solidifiable material container comprising the transparent plate.

14. The method of claim 10, wherein the step of adjusting a relative tilt angle between the transparent plate and the building plane comprises tilting the transparent plate in a direction away from the building plane.

15. The method of claim 10, wherein the step of supplying solidification energy comprises supplying solidification energy from a laser diode.

16. The method of claim 15, wherein the step of supplying solidification energy from a laser diode comprises supplying solidification energy from the laser diode in lines.

17. The method of claim 10, wherein the step of supplying solidification energy comprises supplying solidification energy from one selected from a spatial light modulator and a digital light projector.

18. The method of claim 10, wherein the step of supplying solidification energy comprises transmitting solidification energy upward through the transparent plate to the building plane.

* * * * *